(12) United States Patent
Ku

(10) Patent No.: US 9,346,106 B2
(45) Date of Patent: May 24, 2016

(54) CLAMPING APPARATUS

(71) Applicant: Ming-Che Ku, Taichung (TW)

(72) Inventor: Ming-Che Ku, Taichung (TW)

(*) Notice: Subject to any disclaimer, the term of this patent is extended or adjusted under 35 U.S.C. 154(b) by 288 days.

(21) Appl. No.: 14/183,587

(22) Filed: Feb. 19, 2014

(65) Prior Publication Data
US 2015/0231709 A1    Aug. 20, 2015

(51) Int. Cl.
| | |
|---|---|
| *B23B 31/18* | (2006.01) |
| *B21D 53/30* | (2006.01) |
| *B23B 31/42* | (2006.01) |
| *B23B 31/30* | (2006.01) |
| *B23Q 17/00* | (2006.01) |
| *B23Q 3/06* | (2006.01) |

(52) U.S. Cl.
CPC ............ *B23B 31/42* (2013.01); *B23B 31/18* (2013.01); *B23B 31/302* (2013.01); *B23Q 3/062* (2013.01); *B23Q 17/006* (2013.01); *B21D 53/30* (2013.01); *B23B 2231/26* (2013.01); *Y10T 279/1021* (2015.01); *Y10T 279/1033* (2015.01); *Y10T 279/1095* (2015.01); *Y10T 279/21* (2015.01)

(58) Field of Classification Search
CPC ...... B23B 31/18; B23B 31/302; B23B 31/42; B23B 2231/26; B23Q 17/006; B23Q 3/062; B21D 53/30; Y10T 279/1021; Y10T 279/1033; Y10T 279/1095; Y10T 279/17231; Y10T 279/21

See application file for complete search history.

(56) References Cited

U.S. PATENT DOCUMENTS

| | | | | |
|---|---|---|---|---|
| 4,979,853 A * | 12/1990 | Field | ................ | B23B 31/305 269/48.1 |
| 5,135,242 A * | 8/1992 | Toth | ................ | B23B 31/18 279/109 |
| 5,848,795 A * | 12/1998 | Masatsugu | ......... | B23B 31/1261 279/106 |
| 6,170,835 B1 * | 1/2001 | Noss | ................ | B23B 31/1253 279/121 |
| 8,752,281 B2 * | 6/2014 | Hangleiter | ............ | B23B 31/28 279/135 |
| 2007/0273108 A1 * | 11/2007 | Kitatsuru | ............ | B23B 31/185 279/106 |
| 2012/0018939 A1 * | 1/2012 | Buckley | ............... | B23Q 3/062 269/57 |
| 2013/0033010 A1 * | 2/2013 | Hiestand | ............... | B23B 31/28 279/126 |
| 2014/0271016 A1 * | 9/2014 | Chou | ................ | B23B 31/185 409/224 |

* cited by examiner

Primary Examiner — Eric A Gates
(74) Attorney, Agent, or Firm — Alan D. Kamrath; Kamrath IP Lawfirm, P.A.

(57) ABSTRACT

A clamping apparatus includes a base, a support mechanism mounted on the base, and a plurality of retaining mechanisms mounted on the base. A wheel rim is mounted on the support mechanism of the clamping apparatus to be worked by a wheel rim working machine. Thus, each of the retaining mechanisms of the clamping apparatus presses the inner wall of the wheel rim to position the wheel rim in place when the wheel rim is worked by the wheel rim working machine, so that the wheel rim is positioned by the clamping apparatus, and will not slip or detach from the clamping apparatus due to the high speed operation of the wheel rim working machine.

5 Claims, 5 Drawing Sheets

US 9,346,106 B2

CLAMPING APPARATUS

BACKGROUND OF THE INVENTION

1. Field of the Invention

The present invention relates to a clamping apparatus and, more particularly, to a clamping apparatus for holding a wheel rim during a working process.

2. Description of the Related Art

A conventional clamping apparatus for holding a wheel rim comprises a chuck, a drive shaft connected with the chuck, and a plurality of positioning modules mounted on the chuck. The positioning modules are arranged in a radiating manner along the axial direction of the chuck. Each of the positioning modules includes a clamping claw, a sleeve and a restoring spring. The sleeve and the restoring spring are mounted on the clamping claw respectively. When in use, the wheel rim is mounted on the chuck. Then, the positioning modules are extended outward to abut the inner wall of the wheel rim. Then, the drive shaft is driven to drive and rotate the chuck so as to proceed a turning and cutting process of the wheel rim. Usually, the conventional clamping apparatus comprises many positioning modules to increase the holding force so as to prevent the wheel rim from being loosened during the working process. However, too many positioning modules apply a greater pressure on the wheel rim so that the inner wall of the wheel rim is easily distorted or deformed due to the excessive pressure of the positioning modules, thereby decreasing the working efficiency, precision and quality of the wheel rim, and thereby causing a waste of material.

BRIEF SUMMARY OF THE INVENTION

The primary objective of the present invention is to provide a clamping apparatus that clamps and supports a wheel rim efficiently.

In accordance with the present invention, there is provided a clamping apparatus comprising a base, a sensing module mounted on the base, a plurality of stop blocks mounted on the base, a support mechanism mounted on the base, and a plurality of retaining mechanisms mounted on the base. The base has a central portion provided with an air chamber. The base has an outer wall provided with a platform, an annular groove and a bottom plate. The annular groove of the base has a periphery provided with a plurality of inner channels. The platform of the base has a periphery provided with a plurality of cavities. The bottom plate of the base is provided with a plurality of pivot portions. The stop blocks are located above the platform of the base. The sensing module is pivotally mounted on the periphery of the annular groove of the base and includes a first sensor and a second sensor. The support mechanism includes a moving member extended into the air chamber of the base, a sensing member mounted on the moving member and movable to align with the sensing module, a seat located above the moving member, and a block mounted on the moving member. The moving member of the support mechanism is provided with an annular flange. The seat of the support mechanism has a bottom provided with a depression mounted on the annular flange of the moving member. The seat of the support mechanism has a central portion provided with a through hole connected to the depression. The block of the support mechanism is received in the through hole of the seat. The retaining mechanisms are mounted in the cavities of the platform of the base. Each of the retaining mechanisms includes a thrust unit mounted in the respective inner channel of the annular groove of the base, and a push plate pivotally mounted on the respective pivot portion of the bottom plate of the base and connected with the thrust unit.

According to the primary advantage of the present invention, each of the retaining mechanisms of the clamping apparatus presses the inner wall of the wheel rim to position the wheel rim in place when the wheel rim is worked by the wheel rim working machine, so that the wheel rim is supported and positioned solidly and stably by the clamping apparatus, and will not slip or detach from the clamping apparatus due to the high speed operation of the wheel rim working machine, thereby enhancing the working efficiency, precision and quality of the wheel rim.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
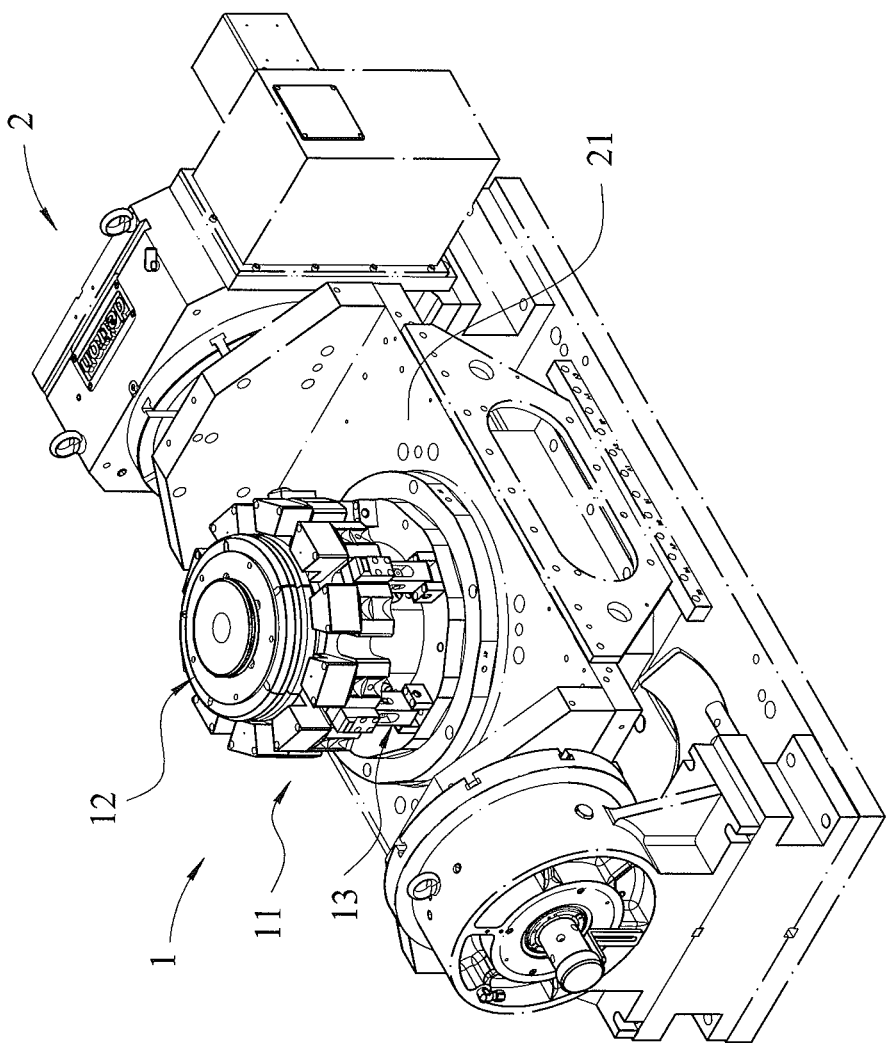
FIG. 1 is a perspective view showing a clamping apparatus being mounted on a wheel rim working machine.
Figure 2:
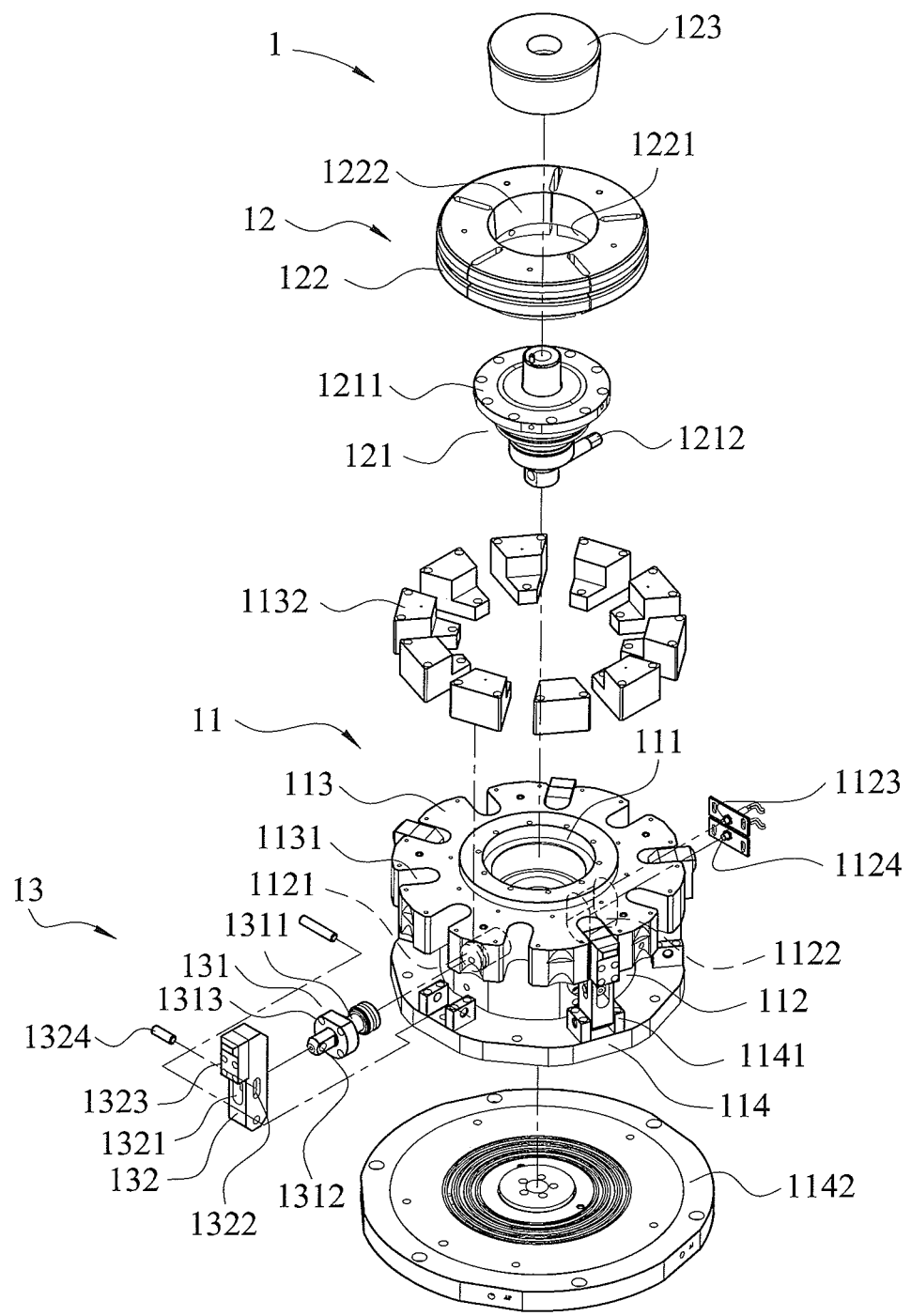
FIG. 2 is an exploded perspective view of the clamping apparatus in accordance with the preferred embodiment of the present invention.
Figure 3:
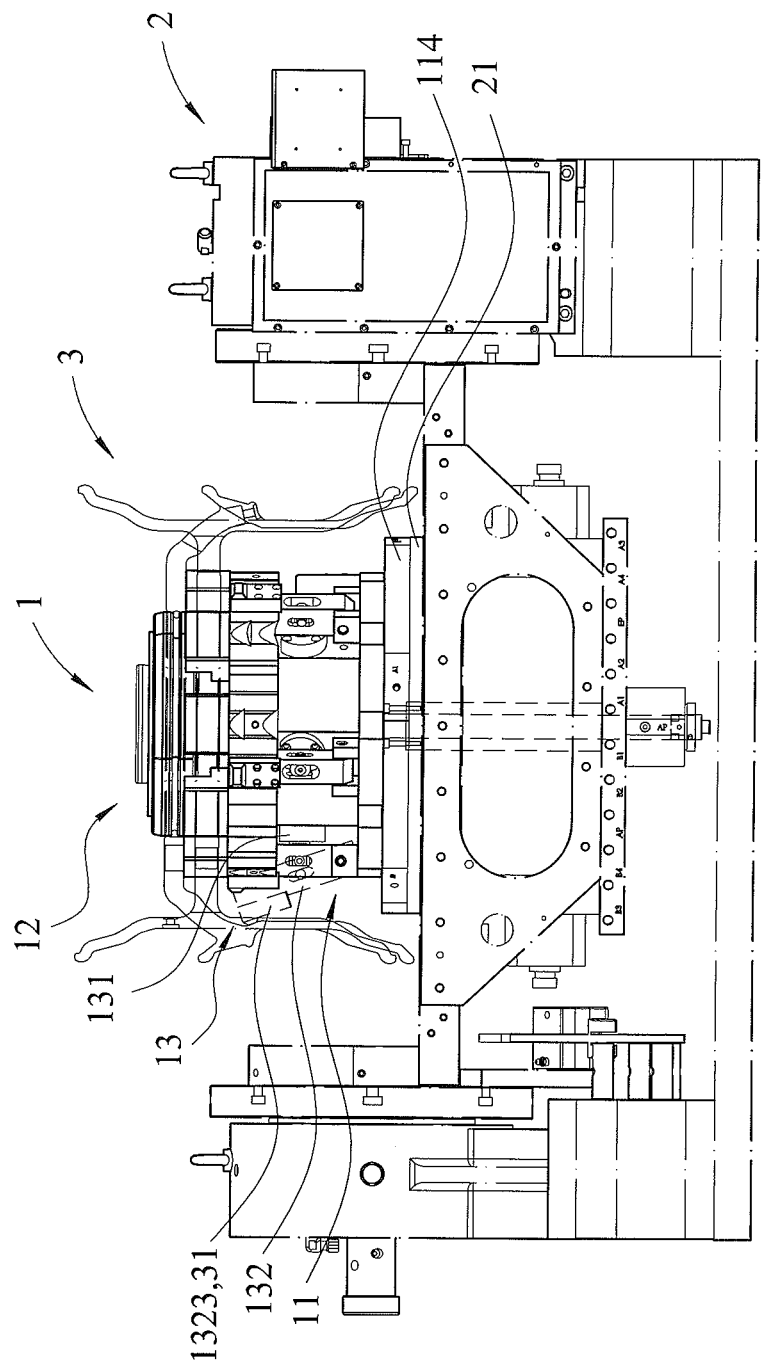
FIG. 3 is a front view showing a wheel rim being mounted on the clamping apparatus.

Referring to the drawings and initially to FIGS. 1-3, a clamping apparatus 1 in accordance with the preferred embodiment of the present invention is mounted on a table 21 of a wheel rim working machine 2, and comprises a base 11, a sensing module 1122 mounted on the base 11, a plurality of stop blocks 1132 mounted on the base 11, a support mechanism 12 mounted on the base 11, and a plurality of retaining mechanisms 13 mounted on the base 11.

The base 11 has a central portion provided with an air chamber 111. The base 11 has an outer wall provided with a platform 113, an annular groove 112 and a bottom plate 114. The annular groove 112 of the base 11 is located between the platform 113 and the bottom plate 114 and has a periphery provided with a plurality of inner channels 1121 extending inward. The platform 113 of the base 11 has a periphery provided with a plurality of cavities 1131 which are located above the inner channels 1121 of the annular groove 112 and arranged in an annular manner. The bottom plate 114 of the base 11 is mounted on the table 21 of the wheel rim working machine 2. The bottom plate 114 of the base 11 is provided with a plurality of pivot portions 1141 located under the inner channels 1121. A connecting seat 1142 is mounted on the bottom plate 114 of the base 11. The stop blocks 1132 are mounted on and located above the platform 113 of the base 11, and are disposed between the inner channels 1121. The sensing module 1122 is pivotally mounted on the periphery of the annular groove 112 of the base 11 and includes a first sensor 1123 and a second sensor 1124.

The support mechanism 12 is pivotally mounted on a top of the base 11 and disposed at a fixed state. The support mechanism 12 includes a moving member 121 extended into the air chamber 111 of the base 11, a sensing member 1212 mounted on the moving member 121 and movable to align with the sensing module 1122, a seat 122 located above the moving member 121, and a block 123 mounted on the moving member 121. The moving member 121 of the support mechanism 12 has an upper end provided with an annular flange 1211. The sensing member 1212 of the support mechanism 12 is mounted on a lower end of the moving member 121. The seat 122 of the support mechanism 12 has a bottom provided with a depression 1221 mounted on the annular flange 1211 of the moving member 121. The seat 122 of the support mechanism 12 has a central portion provided with a through hole 1222 connected to the depression 1221. The block 123 of the support mechanism 12 is pivotally mounted on a top of the moving member 121 and is received in the through hole 1222 of the seat 122. Preferably, the block 123 of the support mechanism 12 has a circular shape.

The retaining mechanisms 13 are mounted in the cavities 1131 of the platform 113 of the base 11. Each of the retaining mechanisms 13 includes a thrust unit 131 mounted in the respective inner channel 1121 of the annular groove 112 of the base 11, and a push plate 132 pivotally mounted on the respective pivot portion 1141 of the bottom plate 114 of the base 11 and connected with the thrust unit 131. The thrust unit 131 of each of the retaining mechanisms 13 is preferably a hydraulic cylinder and includes a drive shaft 1311 having a front end provided with a pivot hole 1312, and a fixing piece 1313 mounted on the drive shaft 1311 and locked (or screwed) onto a periphery of the respective inner channel 1121 of the annular groove 112 of the base 11. The push plate 132 of each of the retaining mechanisms 13 has a side provided with at least one abutting piece 1323. The push plate 132 of each of the retaining mechanisms 13 is provided with a receiving hole 1321 for receiving the drive shaft 1311 of the thrust unit 131. The receiving hole 1321 of the push plate 132 of each of the retaining mechanisms 13 has two opposite sides each provided with an elongate slot 1322 aligning with the pivot hole 1312 of the drive shaft 1311 of the thrust unit 131. Each of the retaining mechanisms 13 further includes a pin 1324 extended through the respective elongate slot 1322 of the receiving hole 1321 of the push plate 132 and the pivot hole 1312 of the drive shaft 1311 of the thrust unit 131 so that the push plate 132 is pivotally connected with the thrust unit 131 and is movable in an inclined manner.

Figure 4:
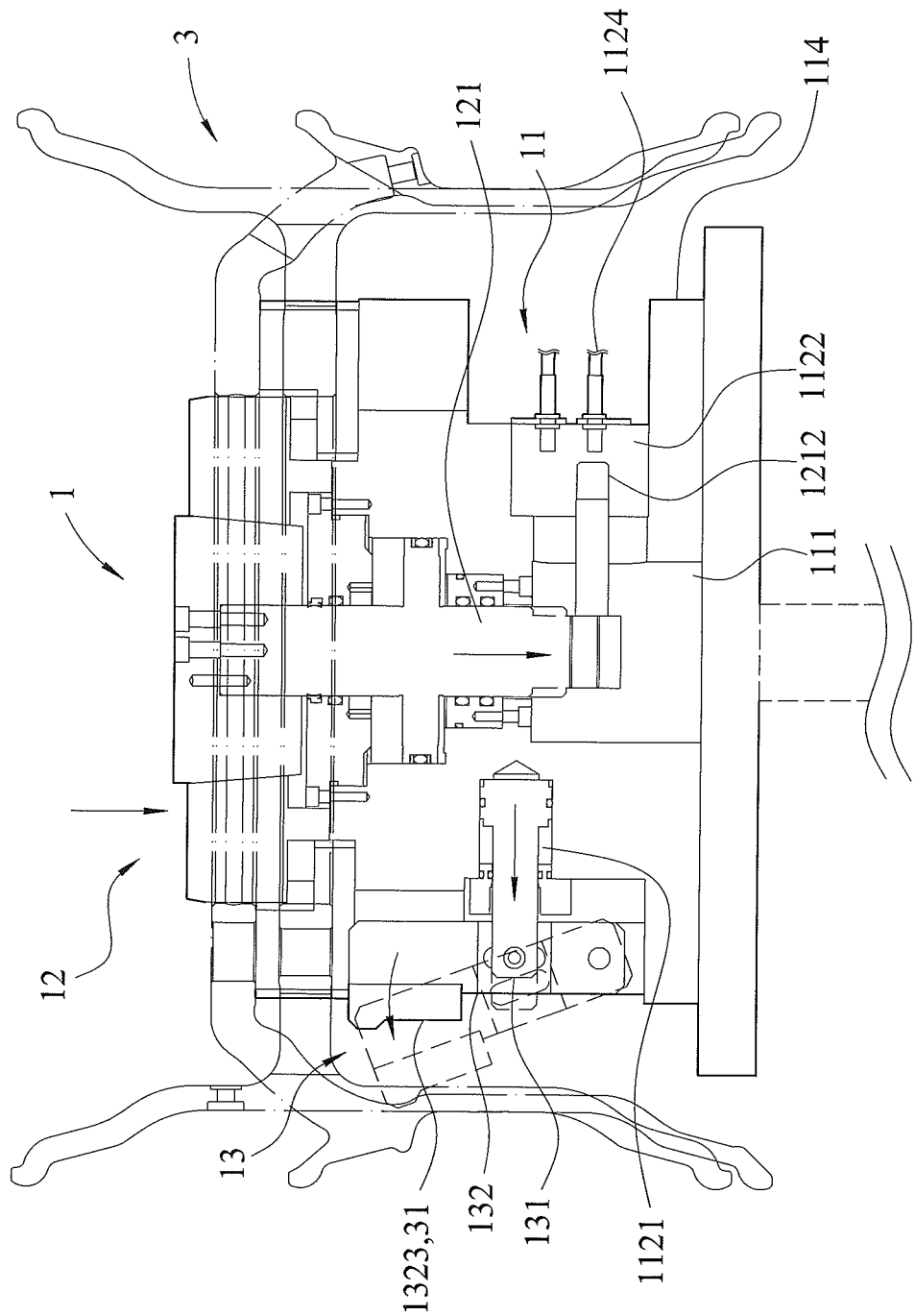
FIG. 4 is a schematic operational view showing the retaining mechanisms of the clamping apparatus being disposed at an abutting status.
Figure 5:
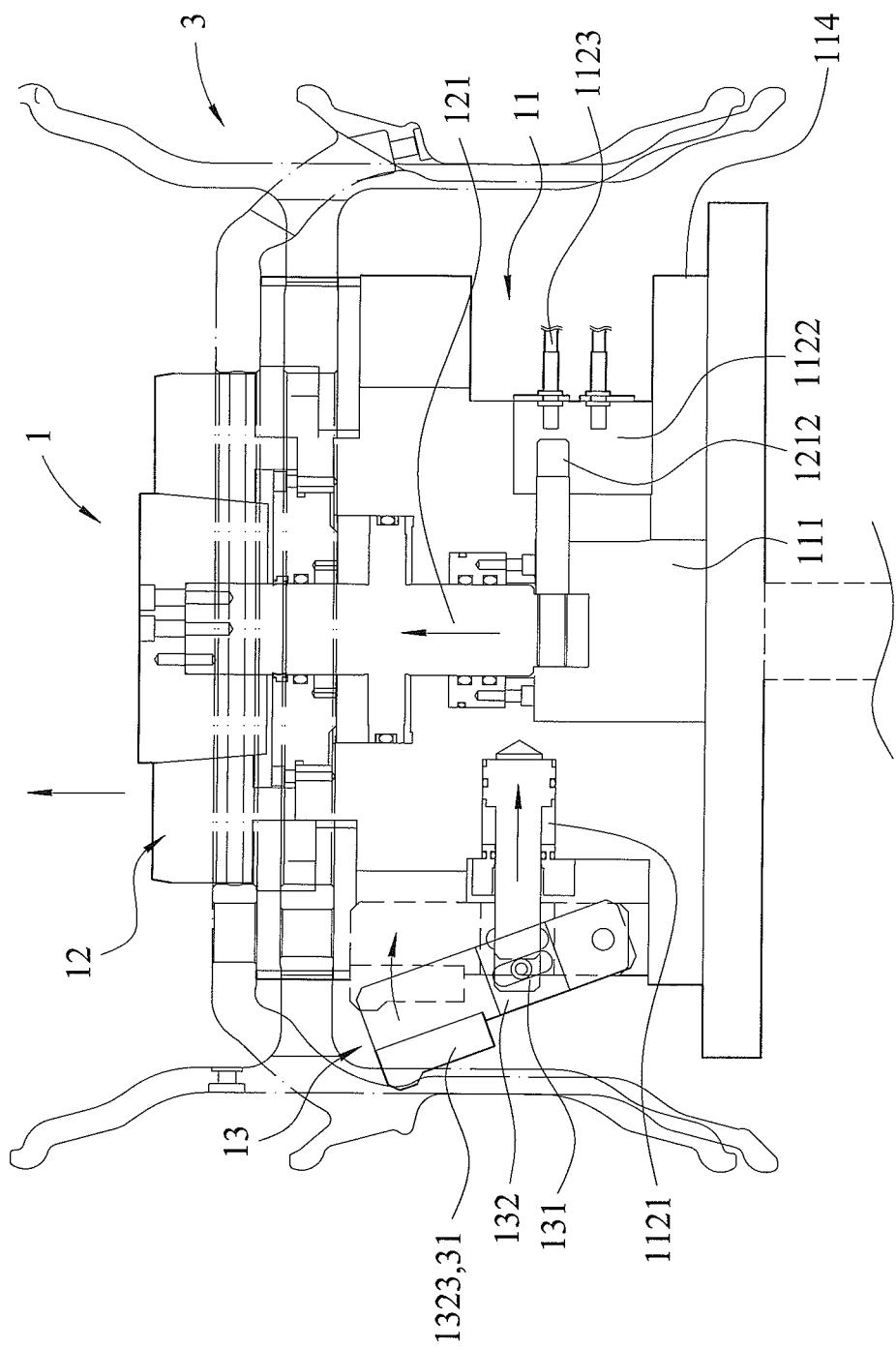
FIG. 5 is a schematic operational view showing the retaining mechanisms of the clamping apparatus being disposed at a folded status.

In operation, referring to FIGS. 4 and 5 with reference to FIGS. 1-3, when a wheel rim 3 is mounted on the support mechanism 12 of the clamping apparatus 1, the support mechanism 12 is pressed and moved downward by the gravity of the wheel rim 3, so that the sensing member 1212 of the support mechanism 12 is moved downward to align and interact with the second sensor 1124 of the sensing module 1122 as shown in FIG. 4, to start the thrust unit 131 of each of the retaining mechanisms 13. In such a manner, the drive shaft 1311 of the thrust unit 131 of each of the retaining mechanisms 13 is moved in the respective inner channel 1121 of the base 11 and extended outward to push the push plate 132, so that the push plate 132 of each of the retaining mechanisms 13 is pivoted and extended outward to press the wheel rim 3. At this time, the abutting piece 1323 of the push plate 132 of each of the retaining mechanisms 13 abuts and presses the inner wall 31 of the wheel rim 3 to position the wheel rim 3 in place. Thus, when the wheel rim 3 is worked by the wheel rim working machine 2, the wheel rim 3 is closely and tightly locked by the retaining mechanisms 13 of the clamping apparatus 1, and will not slip or detach from the clamping apparatus 1 due to the high speed operation of the wheel rim working machine 2, so that the wheel rim 3 is worked by the wheel rim working machine 2 solidly and stably to enhance the working efficiency, precision and quality.

On the contrary, after the working process of the wheel rim 3 is finished, the wheel rim 3 is clamped by a robust arm and moved upward to detach from the support mechanism 12 of the clamping apparatus 1. At this time, the support mechanism 12 is moved upward so that the sensing member 1212 of the support mechanism 12 is moved upward to align and interact with the first sensor 1123 of the sensing module 1122 as shown in FIG. 5, to start the thrust unit 131 of each of the retaining mechanisms 13. In such a manner, the drive shaft 1311 of the thrust unit 131 of each of the retaining mechanisms 13 is moved in the respective inner channel 1121 of the base 11 and retracted inward to pull the push plate 132, so that the push plate 132 of each of the retaining mechanisms 13 is pivoted and retracted inward to detach from the wheel rim 3.

Accordingly, each of the retaining mechanisms 13 of the clamping apparatus 1 presses the inner wall 31 of the wheel rim 3 to position the wheel rim 3 in place when the wheel rim 3 is worked by the wheel rim working machine 2, so that the wheel rim 3 is supported and positioned solidly and stably by the clamping apparatus 1, and will not slip or detach from the clamping apparatus 1 due to the high speed operation of the wheel rim working machine 2, thereby enhancing the working efficiency, precision and quality of the wheel rim 3.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A clamping apparatus comprising:
a base;
a sensing module mounted on the base;
a plurality of stop blocks mounted on the base;
a support mechanism mounted on the base; and
a plurality of retaining mechanisms mounted on the base; wherein:
the base has a central portion provided with an air chamber;
the base has an outer wall provided with a platform, an annular groove and a bottom plate;
the annular groove of the base has a periphery provided with a plurality of inner channels;
the platform of the base has a periphery provided with a plurality of cavities;
the bottom plate of the base is provided with a plurality of pivot portions;
the stop blocks are located above the platform of the base;
the sensing module is pivotally mounted on the periphery of the annular groove of the base and includes a first sensor and a second sensor;
the support mechanism includes:
a moving member extended into the air chamber of the base;
a sensing member mounted on the moving member and movable to align with the sensing module;
a seat located above the moving member; and
a block mounted on the moving member;
the moving member of the support mechanism is provided with an annular flange;
the seat of the support mechanism has a bottom provided with a depression mounted on the annular flange of the moving member;

the seat of the support mechanism has a central portion provided with a through hole connected to the depression;

the block of the support mechanism is received in the through hole of the seat;

the retaining mechanisms are mounted in the cavities of the platform of the base;

each of the retaining mechanisms includes:

a thrust unit mounted in the respective inner channel of the annular groove of the base; and a push plate pivotally mounted on the respective pivot portion of the bottom plate of the base and connected with the thrust unit.

2. The clamping apparatus of claim 1, further comprising:

a connecting seat mounted on the bottom plate of the base.

3. The clamping apparatus of claim 1, wherein the thrust unit of each of the retaining mechanisms includes:

a drive shaft having a front end provided with a pivot hole; and a fixing piece mounted on the drive shaft and locked onto a periphery of the respective inner channel of the annular groove of the base.

4. The clamping apparatus of claim 3, wherein:

the push plate of each of the retaining mechanisms is provided with a receiving hole for receiving the drive shaft of the thrust unit;

the receiving hole of the push plate of each of the retaining mechanisms has two opposite sides each provided with an elongate slot aligning with the pivot hole of the drive shaft of the thrust unit;

each of the retaining mechanisms further includes a pin extended through the respective elongate slot of the receiving hole of the push plate and the pivot hole of the drive shaft of the thrust unit so that the push plate is pivotally connected with the thrust unit and is movable in an inclined manner.

5. The clamping apparatus of claim 3, wherein the push plate of each of the retaining mechanisms has a side provided with at least one abutting piece.

\* \* \* \* \*